US008442103B2

United States Patent
Krishnamurthy (10) Patent No.: US 8,442,103 B2
(45) Date of Patent: May 14, 2013

(54) METHOD AND SYSTEM FOR PROCESSING A SIGNAL IN A COMMUNICATION SYSTEM

(75) Inventor: Sundar Rajan Krishnamurthy, Bangalore (IN)

(73) Assignee: Samsung Electronics Co., Ltd (KR)

( * ) Notice: Subject to any disclaimer, the term of this patent is extended or adjusted under 35 U.S.C. 154(b) by 947 days.

(21) Appl. No.: 12/538,568

(22) Filed: Aug. 10, 2009

(65) Prior Publication Data

US 2010/0034241 A1    Feb. 11, 2010

(30) Foreign Application Priority Data

Aug. 8, 2008    (IN) .......................... 1922/CHE/2008

(51) Int. Cl.
*H03H 7/30*    (2006.01)
*H04L 27/06*    (2006.01)

(52) U.S. Cl.
USPC .......................................... 375/229; 375/340

(58) Field of Classification Search .................. 375/229, 375/230, 232, 233, 234, 285, 316, 346, 348, 375/340, 343; 333/12, 17.1, 18
See application file for complete search history.

(56) References Cited

U.S. PATENT DOCUMENTS

| 7,257,181 B2 * | 8/2007 | Jones et al. | 375/350 |
|---|---|---|---|
| 7,269,216 B2 * | 9/2007 | Kennedy et al. | 375/233 |
| 2002/0131488 A1 * | 9/2002 | Allpress et al. | 375/233 |
| 2006/0240795 A1 * | 10/2006 | He | 455/296 |

* cited by examiner

*Primary Examiner* — David C. Payne
*Assistant Examiner* — Vineeta Panwalkar
(74) *Attorney, Agent, or Firm* — The Farrell Law Firm, P.C.

(57) ABSTRACT

A method and transceiver for processing a signal in a communication system are provided. The method includes identifying a Channel Impulse Response (CIR) of the signal as of minimum phase, maximum phase, or mixed phase, processing the signal without performing prefiltering when the CIR is identified as minimum phase and performing all pass prefiltering of the signal when the CIR is identified as maximum phase or mixed phase. The transceiver includes a computation block and an all pass filter. The computation block identifies CIR of a signal as minimum phase, maximum phase, or mixed phase, performs root identification when the CIR of the signal is identified to be mixed phase and enables all pass filtering of the signal when the CIR of the signal is identified as mixed phase or maximum phase. The all pass filter transforms the signal to its minimum phase equivalent.

20 Claims, 7 Drawing Sheets

METHOD AND SYSTEM FOR PROCESSING A SIGNAL IN A COMMUNICATION SYSTEM

PRIORITY

This application claims priority under 35 U.S.C. §119(e) to Indian Patent Application No. 1922/CHE/2008, entitled "METHOD AND SYSTEM FOR PROCESSING A SIGNAL IN A COMMUNICATION SYSTEM", which was filed in the Indian Intellectual Property Office on Aug. 8, 2008, the contents of which are incorporated herein by reference.

BACKGROUND OF THE INVENTION

1. Field of the Invention

The present invention relates generally to wireless communication systems, and more particularly, to a method and system for processing a signal in a communication system.

2. Description of the Art

Wireless communication systems employ equalization algorithms in order to minimize the deleterious effects of different types of interference in signals. Time dispersive nature of multipath channel causes InterSymbol Interference (ISI) in signals and Viterbi based equalizers are typically employed in order to remove such ISI. Viterbi equalizer performs Maximum Likelihood Sequence Estimation (MLSE) in the sense that all possible symbol combinations are evaluated for closeness with received symbols, with high efficiency based on a multiple state trellis.

For higher-order modulation schemes like 8 Phase Shift Keying (8PSK), full state MLSE cannot be employed due to the high computational complexity involved. Hence reduced state equalizers such as Decision Feedback Sequence Estimation (DFSE) or Reduced State Sequence Estimation (RSSE) are employed in which few leading taps of Channel Impulse Response (CIR) gets a MLSE treatment while the remaining taps of CIR get an instantaneous decision feedback treatment. In such equalizers, performance loss is inevitable compared to full state MLSE, however loss can be significantly reduced by performing minimum phase prefiltering wherein estimated CIR is transformed to its minimum phase equivalent.

Minimum phase filters are characterized by high energies on the leading taps, and have all their zeros inside unit circle. Compared to all other filters with same magnitude response, minimum phase filters have highest partial energy in leading taps, and so are preferable in certain applications. Minimum-phase transformation is the process by which any filter can be transformed to equivalent minimum phase filter with same magnitude response using all-pass filters. All-pass filters have unity magnitude response and are used only for altering signal phase favorably. In practical systems, estimated CIR is often mixed phase, i.e., some roots are inside unit circle while some are not. By using all-pass filters, mixed phase filters can be transformed to minimum phase if such a filter is useful. Prefiltering involves minimum phase transformation, wherein zeros of the CIR located outside the unit circle are cancelled and reflected onto their conjugate reciprocal locations.

Prefiltering can be performed using one of the following methods—prediction error filter, Minimum Mean Squared Error-Decision feedback Equalization (MMSE-DFE), spectral factorization, or root-finding approach. Spectral factorization is not considered for Enhanced Data rate for Global System for Mobile communications (GSM) Evolution (EDGE) 8PSK equalization due to high computational complexity. Root-finding approach is not used when filter order is high since iterative search algorithms are involved. Feed-forward filter of MMSE-DFE is known to yield a minimum phase filter when infinite length DFE is considered. However, practical implementation constraints do not facilitate usage of MMSE-DFE as a minimum phase prefilter. Hence a prediction error filter is typically employed in conventional EDGE 8PSK equalizers, which identifies a prediction error filter using Levinson-Durbin recursive algorithm on the 1-sided autocorrelation sequence of the CIR.

Co-channel interference (CCI) mitigation has received lot of attention in recent years, as GSM/EDGE Radio Access Network (GERAN) evolution path has taken interference cancellation as one of the key features to improve receiver performance, and in turn spectral efficiency. While efficient single antenna interference cancellation algorithms have been used for real-valued modulation schemes such as Gaussian Minimum Shift Keying (GMSK), dual antenna receivers are required for complex-valued modulation scheme such as 8PSK. Interference cancellation using antenna array is a well-known technique that typically employs a space-time adaptive filter that weighs and combines signals. Feed-forward and feed-back filters are estimated and used, wherein feed-forward filter is used to cancel CCI and ISI identified by feed-back filter is cancelled by subsequent reduced state equalizer.

While linear prediction based prefiltering is optimum in terms of performance and complexity for conventional EDGE 8PSK equalizers, dual antenna receiver calls for an alternate approach. Dual antenna receivers involve high computational complexity due to processing 2 streams of samples from separate antennas. While the interference canceling filter provides huge performance gains, complexity increases considerably compared to conventional equalizers. Since complexity of algorithms is a crucial aspect in dual antenna receivers, algorithms such as minimum phase prefiltering require significant focus.

In light of the above, there is a need for a simplified method for adaptive prefiltering.

SUMMARY OF THE INVENTION

According to an embodiment of the present invention, provided is a method for processing a signal in a communication system, including identifying a CIR of the signal as one of minimum phase, maximum phase, and mixed phase, processing the signal without performing prefiltering when the CIR is identified as minimum phase, and performing all pass prefiltering of the signal when the CIR is identified as maximum phase or mixed phase.

According to another embodiment of the present invention, a method for processing a signal in a communication system is provided, wherein a maximum phase signal is processed in time reversed direction.

The present invention further provides a transceiver including an all pass filter configured to transform the signal to its minimum phase equivalent, and a computation block configured to identify a CIR of the signal as one of minimum phase, maximum phase, and mixed phase. The computation block is further configured to perform root identification when the CIR of the signal is identified as being mixed phase, and to enable all pass filtering of the signal when the CIR of the signal is identified as mixed phase or maximum phase.

In another embodiment, the present invention provides a transceiver including a computation block, an all pass filter and an equalizer. The computation block is configured to identify CIR of a signal as one of minimum phase, maximum phase, and mixed phase, to perform root identification when the CIR of the signal is identified to be mixed phase, and to enable all pass filtering of the signal when the CIR of the signal is identified as mixed phased and enable time reversed processing of the signal when the CIR of the signal is identified as maximum phased. The all pass filter is configured to transform the mixed phased signal to its minimum phase equivalent. The equalizer is configured to process the maximum phased signal in a time reversed direction.

Features and advantages of the present invention will become more apparent from the ensuing detailed description of the invention taken in conjunction with the accompanying figures.

BRIEF DESCRIPTION OF THE DRAWINGS

In the accompanying figures, similar reference numerals may refer to identical or functionally similar elements. These reference numerals are used in the detailed description to illustrate various embodiments and to explain various aspects and advantages of the present invention.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present invention.

DETAILED DESCRIPTION OF THE EMBODIMENTS

The matters defined in the description such as a detailed construction and elements are provided to assist in a comprehensive understanding of embodiments of the invention. Accordingly, those of ordinary skill in the art will recognize that various changes and modifications to the embodiments described herein can be made without departing from the scope and spirit of the invention. Also, descriptions of well-known functions and constructions are omitted for the sake of clarity and conciseness.

Figure 1:
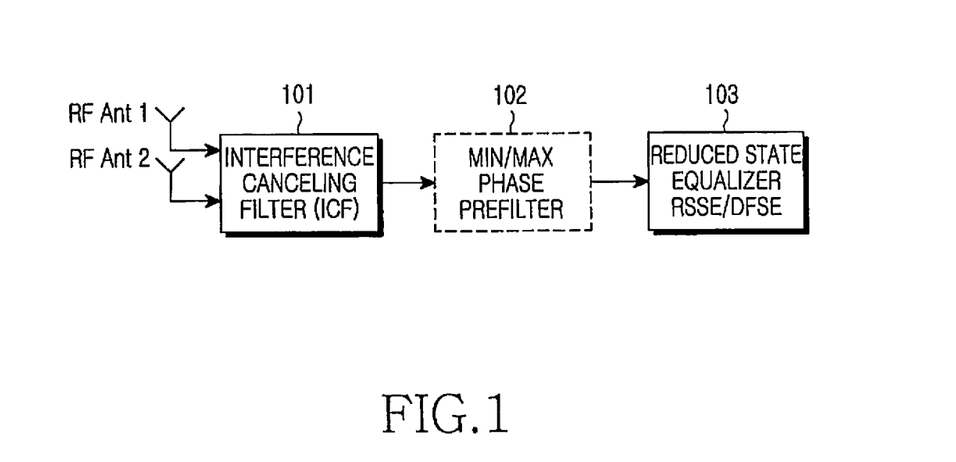
FIG. 1 illustrates a dual antenna receiver to which present invention can be applied.

FIG. 1 illustrates a dual antenna receiver to which present invention can be applied. The dual antenna receiver includes an Interference Cancellation Filter (ICF) 101, a minimum/maximum phase prefilter 102, and a reduced state equalizer 103 which is based on either Reduced State Sequence Estimation (RSSE) or Decision Feedback Sequence Estimation (DFSE) techniques. The ICF 101 possesses a Minimum Mean Square Error (MMSE)-Decision Feedback Equalizer (DFE) structure. As a result, additional minimum phase prefiltering is avoided in order to reduce complexity. A Finite Impulse Response (FIR) feed forward filter is known to provide approximation of an all pass filter that results in a minimum phase CIR.

The decision of a feed forward filter length of ICF 101 primarily depends on interference cancellation performance with minimal computational load on matrix inversion technique. Due to such complexity considerations, the feed forward filter may not always result in minimum phase channels, indicating that further improvements could be achieved by performing prefiltering. Hence, it is preferable to employ a low complexity prefiltering algorithm based on root-finding after the ICF 101. Such a root-finding based prefiltering can be adaptive, and a highly accurate minimum phase CIR enabling improved performance of the subsequent reduced state equalizer can be ensured.

Figure 2:
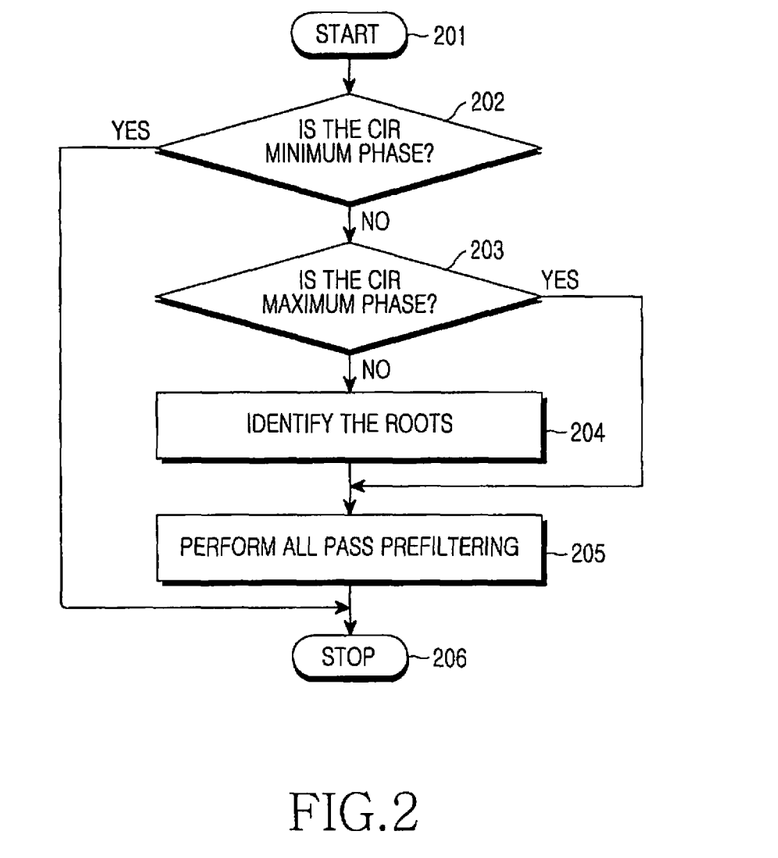
FIG. 2 illustrates an adaptive prefiltering technique employing a root finding method in accordance with an embodiment of the present invention.
Figure 3:
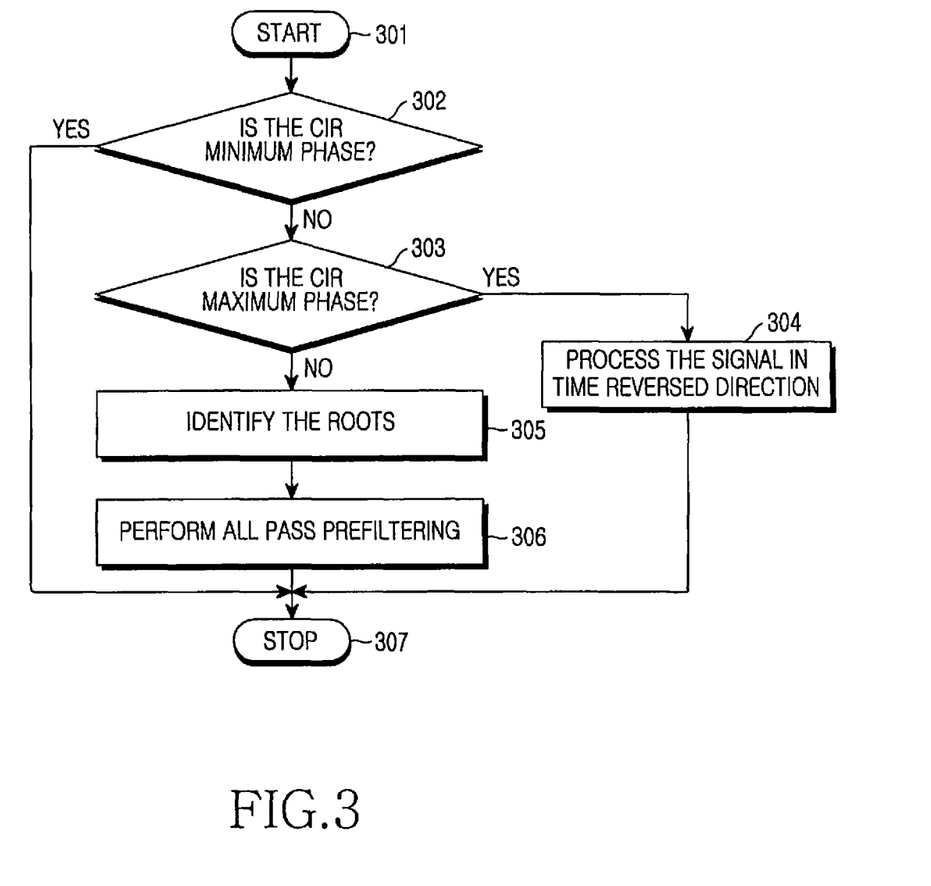
FIG. 3 illustrates an adaptive prefiltering technique employing a root finding method according to an embodiment of the present invention.

FIGS. 2 and 3 respectively illustrate first and second embodiments of an adaptive prefiltering technique employing a root finding method, according to the present invention. As will be described below, the first embodiment involves the filter type identification wherein the feedback filter of the ICF or the channel impulse response is classified as minimum phase, maximum phase or mixed phase. This classification helps to employ the adaptive prefiltering strategy for a second order root-finding based prefiltering. After the filter type has been classified, additional all-pass prefiltering can be employed only for mixed phase and maximum phase channels.

Filter can be classified by using Stability triangle, which is normally employed in order to assess the stability of a real-valued second order filter with 2 poles, without explicit computation of pole locations. In order to determine stability, inequalities using filter coefficients can be used. For a real-valued filter H with two poles, the stability triangle can be expressed by two inequalities, $$|h_1| < h_0 + h_2 \ldots (R_{nm})$$

$$|h_2| < |h_0| \ldots (R_{min})$$

Wherein:
h0, h1, and h2 are real-valued filter coefficients of the CIR; and in Equation (1), $$H = \frac{K}{h_0 + h_1 z^{-1} + h_2 z^{-2}} \quad (1)$$

Where:
K=gain; and
z=z transform of CIR

If the inequalities are satisfied, it can be deduced that the filter is stable without having to compute the roots of the polynomial. Similarly, the same inequalities can be used for determining the minimum-phase nature of a real-valued filter with two zeros. Inequality $R_{nm}$ can be used to differentiate mixed phase and non-mixed phase systems, and inequality $R_{min}$ can then be used to differentiate minimum phase and maximum phase systems. The foregoing inequalities are valid as long as channel coefficients are real, while the roots may be real or complex.

For second order filters with complex-valued channel coefficients, a Schur-Cohn stability test that analyzes the reflection coefficients of the second order polynomial can be employed. The following expressions for inequalities based on the Schur-Cohn stability test can be used:

$$|\tilde{h}_1 - \tilde{h}_2 \tilde{h}_1^*|^2 < (1 - |\tilde{h}_2|^2)^2 \ldots (SC_{nm})$$

$|\tilde{h}_2|^2 < 1 \ldots (SC_{min})$

Where $h_0$, $h_1$, $h_2 \epsilon C$. where $h_0$, $h_1$, $h_2$ are the second order filter coefficients, $$\tilde{h}_1 = \frac{h_1}{h_0}; \tilde{h}_2 = \frac{h_2}{h_0}$$

and $\tilde{h}_1^*$ is a complex conjugate of $\tilde{h}$.

When $h_0$ is 1 or some constant value, division would not be required. When $h_0$ is not a constant, additional division and square root operations would be involved, which raises similar concerns of accuracy loss and complexity. Hence, instead of inequality $SC_{nm}$, modified inequalities are identified which when used, would not result in accuracy loss due to square root or division approximations.

When both zeros are inside or outside the unit circle, or if the filter is in non-mixed phase, the following relation applies:

$(1-|r_1|^2)(1-|r_2|^2) < 0$

Following inequality $C_{nm}$ has been derived using the above relation, $2(|h_0|^2+|h_2|^2)-|h_1|^2 > |d| \ldots (C_{nm})$ where $d = h_1^2 - 4h_0 h_2$ The above inequality can also be reformulated so as to avoid square root operations, with $h_0, h_1, h_2 \epsilon C$ $x > y \ldots (C_{nm1})$ $(x-y)^2 > |d|^2 \ldots (C_{nm2})$ where $x = 2(|h_0|^2+|h_2|^2); y = |h_1|^2$ and $|h_2|^2 < |h_0|^2 \ldots (C_{min})$ The foregoing inequalities can be used to determine whether CIR is a non-mixed phase, for example, $\{C_{nm1}, C_{nm2}\}$ together serves as the counterpart of $R_{nm}$ for complex-valued coefficients. For such a non-mixed phase filter, a minimum phase nature can then be identified using a squared version of inequality $R_{min}$ specified for stability triangle $(C_{min})$. If inequality $C_{min}$ is not satisfied, the filter can be classified as maximum phase.

In the first embodiment illustrated in FIG. 2, the filter type classification based on the foregoing inequalities is performed so that the additional minimum phase prefiltering can be adaptively performed. The method involves identifying the CIR as minimum, mixed or maximum phase based on any of the foregoing three sets of inequalities. The method for adaptive prefiltering is initiated at step 201. At step 202 it is determined whether the CIR is minimum phase. If it is determined at step 202 that the CIR is minimum phase, the signal is passed without prefiltering, and the method ends at step 206. If it is determined at step 202 that the CIR is not minimum phase, the method proceeds to step 203.

At step 203, it is determined whether the CIR is maximum phase or mixed phase. If it is determined at step 203 that the CIR is mixed phase, roots of the CIR are identified at step 204. Thereafter, all pass prefiltering is performed for the signal with CIR as mixed phase. If it is determined at step 203 that the CIR is maximum phase, all pass filtering is performed at step 205 (with identifying root of the signal). Such a prefiltering strategy helps in performing root identification only for mixed phase CIR, thereby minimizing the misdetection probability of the minimum phase nature of CIR. After root identification, the all pass filter required for filtering data may be unstable. Since the below relation is satisfied, the stable all pass filter on the right side can be used for prefiltering of data, as proposed in the prior art by U.S. Pat. No. 6,044,111 (Gerstacker et al).

$$\frac{H_{min}(z)}{H(z)} = \frac{H^*(1/z^*)}{H_{min}^*(1/z^*)}$$

where $H(z)$ denotes the z-transform of the CIR;

$H_{min}(z)$ denotes the z-transform of the minimum phase equivalent of the CIR;

$H^*(1/z^*)$ denotes the time reversed complex conjugate of $H(z)$; and $H_{min}^*(1/z^*)$ denotes the time reversed complex conjugate of $H_{min}(z)$.

No additional operations are performed on minimum phase channels. Since the all-pass filter can be directly determined based on channel coefficients, root finding can be avoided for a signal with maximum phase CIR and data can be filtered through the combined filter that considers both roots. Thus, the disclosed inequalities facilitate complexity reduction when minimum and maximum phase CIR is processed, which are dominant in many Global System for Mobile communications (GSM) channel profiles.

FIG. 3 illustrates a second embodiment of an adaptive prefiltering technique employing a root finding method according to the present invention. The method involves identifying the CIR as minimum phase, mixed phase or maximum phase, based on any of the foregoing three sets of inequalities. The method for adaptive prefiltering is initiated at step 301. At step 302 it is determined whether the CIR is minimum phase. If it is determined at step 302 that the CIR is minimum phase, the signal is passed without prefiltering, and the method ends at step 307. If it is determined at step 302 that the CIR is not minimum phase, the method proceeds to step 303.

Step 303 differentiates maximum phase CIR from mixed phase CIR, by determining whether the CIR is maximum phase. If the CIR is determined as maximum phase, the method proceeds to step 304, where the signal is processed in time reversed direction instead of performing minimum phase prefiltering. Minimum and maximum phase CIR are classified without root finding.

However, if the CIR is not determined as maximum phase in step 303, then the CIR is a mixed phase CIR, and roots are identified in step 305 and subsequent all pass filtering is performed in step 306. Thereafter, the method ends in step 307.

Figure 4:
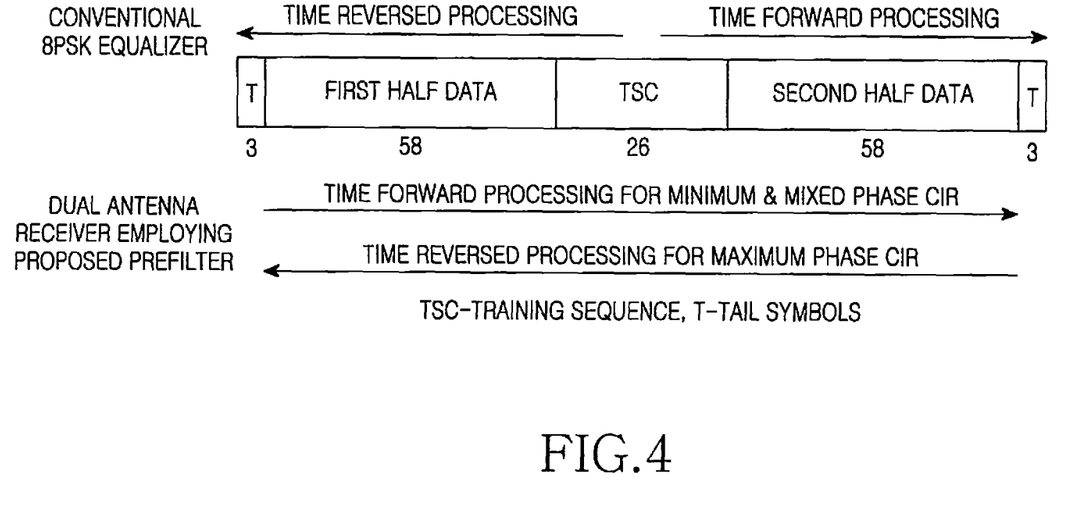
FIG. 4 illustrates an equalization flow, according to an embodiment of the present invention.

In dual antenna receivers that employ the disclosed method for prefiltering, instead of performing both time forward and time reversed processing for each burst, one of the two processing techniques can be selected depending upon whether the filter is maximum phase. In all cases, tail symbols present in either end of the bursts can be used for Viterbi path metric initialization due to short length of the CIR. FIG. 4 illustrates that time reversed processing is applied only for maximum phase CIR, while minimum phase CIR can be processed in time forward direction as in case of conventional equalizers. However, the equalizer needs to process entire 142 symbols in same direction, that is both first and second halves of the burst along with training sequence. It can be noted that this may require hardware assistance for processing symbols in time reversed direction. Such a prefiltering strategy helps in performing root identification only for mixed phase channels, thereby minimizing the misdetection probability of the minimum phase nature of CIR.

No additional operations are performed on minimum phase channels. Since an all-pass filter can be directly determined based on channel coefficients, root finding can be avoided for a signal with a maximum phase CIR and data can be filtered through the combined filter that considers both roots. The disclosed inequalities also facilitate complexity reduction when minimum and maximum phase CIRs are processed, which are dominant in many GSM channel profiles.

In the present invention, the disclosed method of filter classification is also applied for higher order modulation schemes such as Quadrature Phase-Shift Keying (QPSK) and 16 Quadrature Amplitude Modulation (QAM) which also uses reduced state equalization algorithms. In general, whenever reduced state equalizers with second order channel impulse responses are considered, the adaptive prefiltering method can be applied for accurate and efficient filter classification and minimum phase prefiltering.

In the present invention, the disclosed inequalities can also be used to perform stability analysis of a second order filter without performing any square root or division operations. Since the method used for filter stability identification is efficient, more accurate results are obtained with reduced complexity.

Figure 5:
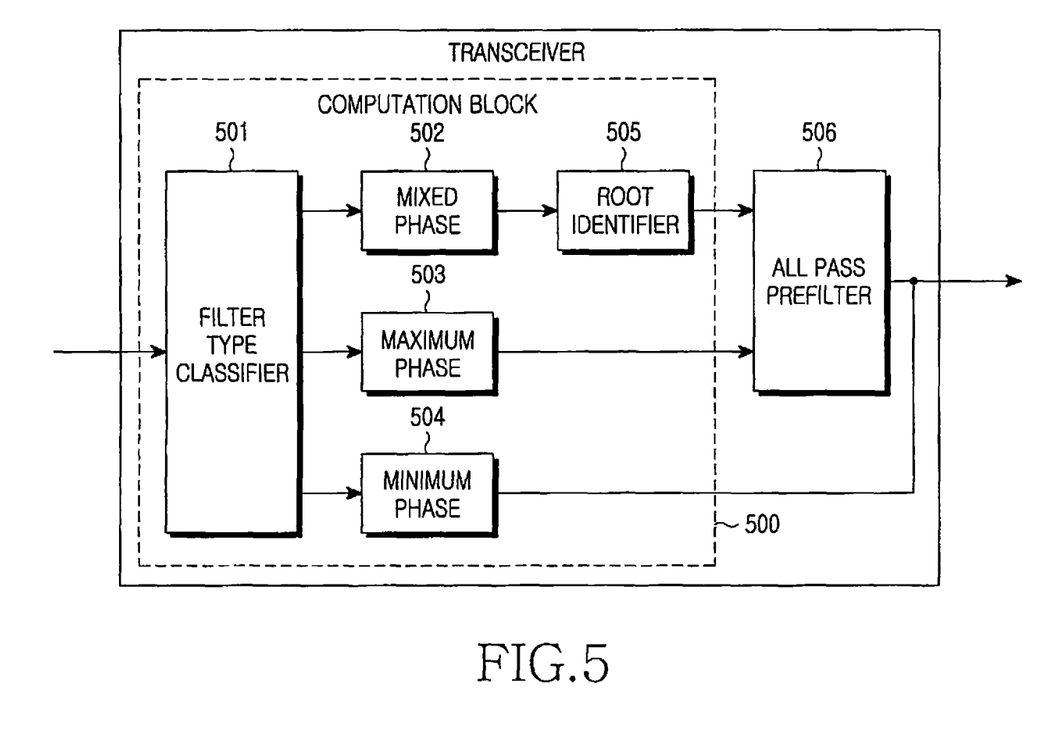
FIG. 5 illustrates a transceiver according to an embodiment of the present invention.

FIG. 5 illustrates a transceiver according to a first embodiment of the present invention. The transceiver includes a computation block 500 and an all pass prefilter 506. The computation block 500 consists of a filter type classifier 501 and a root identifier 505. The filter type classifier 501 receives a signal having known filter coefficients. The filter type classifier identifies the CIR of the signal as minimum phase 504, maximum phase 503 or mixed phase 502, based on those filter coefficients. For the mixed phase 502 CIR the root identifier 505 identifies the roots. Prefiltering is not performed for the signal with the minimum phase 504 CIR. For the maximum phase 503 CIR and mixed phased 502 CIR, minimum phase prefiltering is performed by the all pass prefilter 506.

Figure 6:
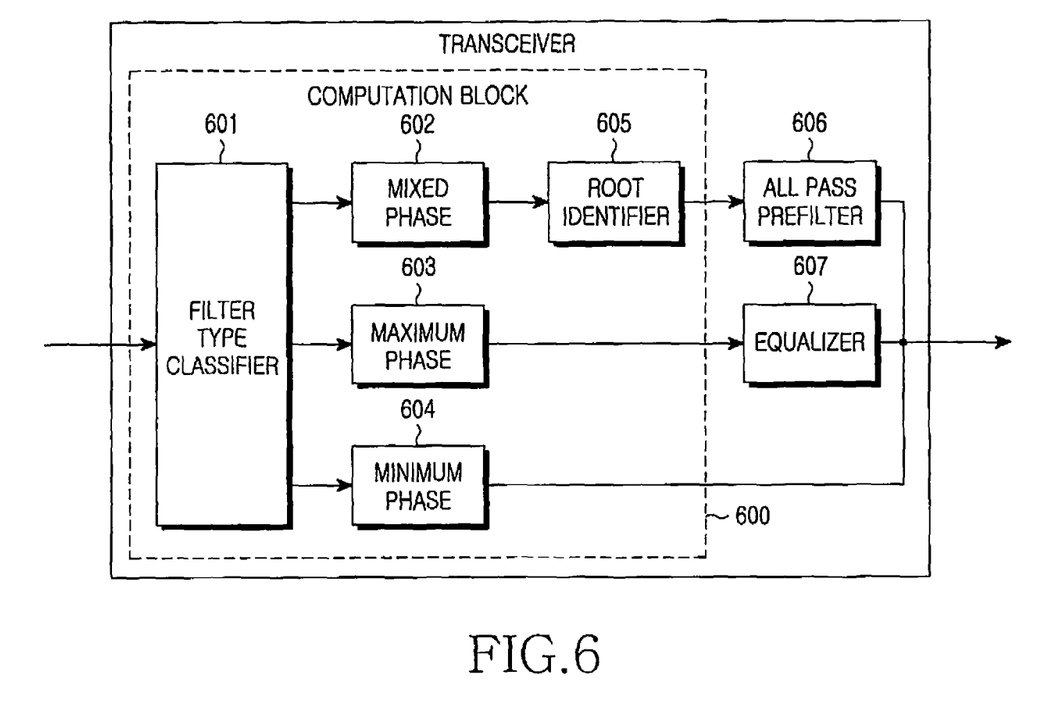
FIG. 6 illustrates a transceiver according to an embodiment of the present invention.

FIG. 6 illustrates a transceiver according to a second embodiment of the present invention. The transceiver includes a computation block 600 an all pass prefilter 606 and an equalizer 607 capable of performing time reversed processing. The computation block consists of a filter type classifier 601 and a root identifier 605. The filter type classifier 601 receives a signal having known filter coefficients. The filter type classifier 601 identifies the CIR of the signal as minimum phase 604, maximum phase 603 or mixed phase 602, based on those filter coefficients. For the mixed phase 602 CIR, the root identifier 605 identifies the roots. Prefiltering is not performed for the minimum and maximum phase 604 CIR. The maximum phase 603 CIR is processed in time reversed direction by the equalizer 607. For the mixed phased 602 CIR, minimum phase prefiltering is performed by the all pass prefilter 606.

Figure 7:
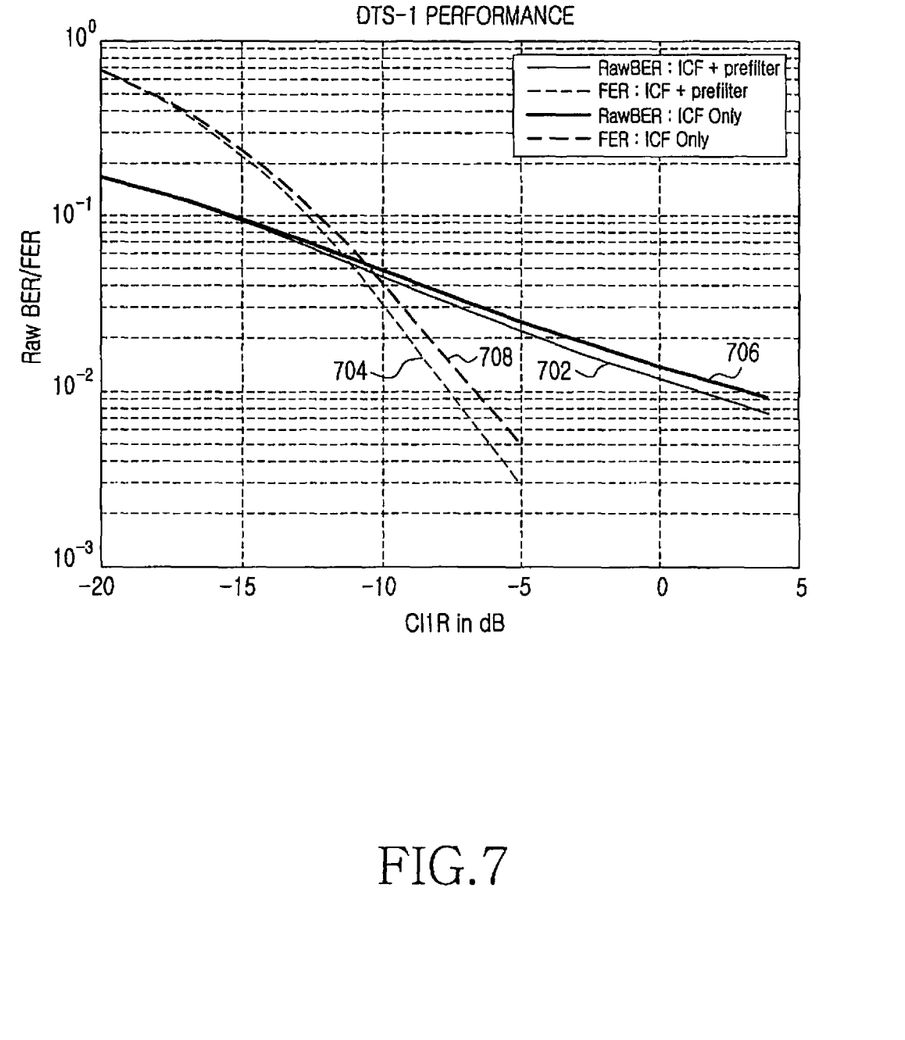
FIG. 7 illustrates the performance gains realized in a Downlink Advanced Receiver Performance (DARP) Phase II Test Scenario—DTS-1 scenario, according to an embodiment of the present invention.

FIG. 7 illustrates the performance gains observed in a DTS1 scenario, for example, carrier with single interferer, in Downlink Advanced Receiver Performance (DARP) Phase II Test Scenario—DTS. One skilled in the art will be able to appreciate that the performance gains are similar to those realized when performing prefiltering using a prediction error filter. 702 indicates Raw Bit Error Rate (RawBER): ICF+prefilter. 704 indicates Frame Error Rate (FER): ICF+prefilter. 706 indicates RawBER: ICF only. 708 indicates FER: ICF only. Close to 1 dB gains can be observed in RawBER or FER for error rate of 1%, when the prefilter is added. FER has been calculated for MCS5 channel of EDGE. These gains are dependent on the statistics of zero locations of the CIR. With similar gains as prediction error filter, the method also facilitates processing with much less complexity.

While the embodiments of the present invention have been illustrated and described, it will be clear that the present invention and its advantages are not limited to these embodiments only. Numerous modifications, changes, variations, substitutions and equivalents will be apparent to those skilled in the art without departing from the spirit and scope of the present invention as described in the claims. Accordingly, the specification and figures are not to be regarded as restrictive, but instead as illustrative examples of the present invention.

What is claimed is:

1. A method for processing, by a transceiver, a signal in a communication system, the method comprising:
   identifying a Channel Impulse Response (CIR) of the signal as one of minimum phase, maximum phase and mixed phase;
   processing the signal without performing prefiltering when the CIR is identified as minimum phase; and
   performing all pass prefiltering of the signal when the CIR is identified as one of maximum phase and mixed phase.

2. The method of claim 1, further comprising performing root identification when the CIR of the signal is identified as mixed phase.

3. The method of claim 1, wherein identification of the CIR having real valued filter coefficients is performed using first and second inequalities of a stability triangle, the first inequality being expressed as $|h_1|<h_0+h_2$, and
   the second inequality being expressed as $|h_2|<|h_0|$,
   wherein $h_0$, $h_1$, and $h_2$ are real-valued filter coefficients of the CIR, and
   wherein a real valued CIR is identified as the minimum phase, when the first inequality and the second inequality are satisfied,
   the maximum phase, when the first inequality is satisfied and the second inequality is not satisfied, and
   the mixed phase, when the first inequality is not satisfied.

4. The method of claim 1, wherein identification of the CIR having complex valued filter coefficients with fixed leading coefficient, is performed using first and second inequalities of a Schur Cohn stability test,
   the first inequality being expressed as $|\tilde{h}_1-\tilde{h}_2\tilde{h}_1^*|^2<(1-|\tilde{h}_2|^2)^2$, and
   the second inequality being expressed as $|\tilde{h}_2|^2<1$, wherein $$\tilde{h}_1 = \frac{h_1}{h_0}; \tilde{h}_2 = \frac{h_2}{h_0};$$

$\tilde{h}_1^*$=complex conjugate of $\tilde{h}1$; $h_0$, $h_1$, and $h_2$ are complex-valued filter coefficients of the CIR, and
   wherein complex valued CIR is identified as the
   minimum phase, when the first inequality and the second inequality are satisfied, the maximum phase, when the first inequality is satisfied and the second inequality is not satisfied, and the
   mixed phase, when the first inequality is not satisfied.

5. The method of claim 1, wherein identification of the CIR having complex valued filter coefficients is performed using first, second and third inequalities, the first inequality being expressed as x>y,
   the second inequality being expressed as $(x-y)^2>|h_1^2-4h_0h_2|^2$, and the third inequality being expressed as $|h_2|^2<|h_0|^2$, wherein $x=2(|h_0|^2+|h_2|^2)$; $y=|h_1|^2$; and $h_0$, $h_1$, $h_2$ are complex-valued filter coefficients of the CIR, and wherein a complex valued channel impulse response is identified as minimum phase, when the first inequality, the second inequality and the third inequality are satisfied, the maximum phase, when the first inequality and the second inequality are satisfied and the third inequality is not satisfied, and the mixed phase, when at least one of the first inequality and the second inequality is not satisfied.

6. The method of claim 1, wherein all pass prefiltering is performed based on a difference equation with poles inside a unit circle given by:

$$\frac{H_{min}(z)}{H(z)} = \frac{H^*(1/z^*)}{H^*_{min}(1/z^*)},$$

wherein:

H(z)=z-transform of the CIR;
Hmin(Z)=z-transform of minimum phase equivalent of the CIR;
H*(1/Z*)=time reversed complex conjugate of H(z); and
Hmin*(1/Z*)=time reversed complex conjugate of Hmin (z), and wherein transformation of the mixed phase CIR is performed using a first order difference equation and transformation of the maximum phase CIR is performed using a second order difference equation.

7. A transceiver for processing a signal in a communication system, the transceiver comprising:
a computation block configured to identify a Channel Impulse Response (CIR) of the signal as one of a minimum, a maximum and a mixed phase, and to enable all pass filtering of the signal when the CIR of the signal is identified as one of the maximum phase and the mixed phase; and
an all pass filter configured to transform the signal to a minimum phase equivalent, wherein the signal is allowed to pass through without performing prefiltering when the CIR of the signal is identified as the minimum phase.

8. The transceiver of claim 7, wherein the computation block is further configured to perform root identification when the CIR of the signal is identified as the mixed phase.

9. The transceiver of claim 7, wherein the computation block, comprises:
a filter type classifier configured to identify the Channel Impulse Response (CIR) of the signal as one of the minimum phase, the maximum phase and the mixed phase;
a minimum phase unit configured to allow the signal to pass through without performing prefiltering when the CIR of the signal is identified as the minimum phase;
a maximum phase unit configured to enable all pass filtering of the signal when the CIR of the signal is identified as one of the maximum phase: and
a mixed phase unit configured to enable all pass filtering of the signal when the CIR of the signal is identified as the mixed phase.

10. The transceiver block of claim 9, wherein the computation block is further configured to perform root identification when the CIR of the signal is identified as the mixed phase.

11. A method for processing, by a transceiver, a signal in a communication system, the method comprising:
identifying a Channel Impulse Response (CIR) of the signal as one of a minimum phase, a maximum phase and a mixed phase;
processing the signal without performing prefiltering when the CIR is identified as the minimum phase;
performing all pass prefiltering of the signal when the CIR is identified as the mixed phase; and
processing the signal in a time reversed direction when CIR is identified as the maximum phase.

12. The method of claim 11, further comprising performing root identification when the CIR of the signal is identified as the mixed phase.

13. The method of claim 11, wherein identification of a CIR having real valued filter coefficients is performed using first and second inequalities of a stability triangle, the first inequality being expressed as $|h_1|<h_0+h_2$, and
the second inequality being expressed as $|h_2|<|h_0|$,
wherein $h_0$, $h_1$, and $h_2$ are real-valued filter coefficients of the CIR, and
wherein a real valued channel impulse response is identified as the minimum phase, when the first inequality and the second inequality are satisfied,
the maximum phase, when the first inequality is satisfied and the second inequality is not satisfied, and the
mixed phase, when the first inequality is not satisfied.

14. The method of claim 11, wherein identification of a CIR having complex valued filter coefficients with a fixed leading coefficient is performed using first and second inequalities of a Schur Cohn stability test, the first inequality being expressed as $|\tilde{h}_1-\tilde{h}_2\tilde{h}_1^*|^2<(1-|\tilde{h}_2|^2)^2$, and
the second inequality being expressed as $|\tilde{h}_2|^2<1$, wherein:

$$\tilde{h}_1 = \frac{h_1}{h_0}; \tilde{h}_2 = \frac{h_2}{h_0};$$

$\tilde{h}_1^*$=complex conjugate of $\tilde{h}1$; $h_0$, $h_1$, and $h_2$ are complex-valued filter coefficients of the CIR, and
wherein a complex valued channel impulse response is identified as the
minimum phase, when the first inequality and second inequality are satisfied, the
maximum phase, when the first inequality is satisfied and second inequality is not satisfied, and the
mixed phase, when the first inequality is not satisfied.

15. The method of claim 11, wherein identification of a CIR having complex valued filter coefficients is performed using first, second and third inequalities, the
first inequality being expressed as x>y,
the second inequality being expressed as $(x-y)^2>|h_1^2-4h_0h_2|^2$, and
the third inequality being expressed as $|h_2|^2<|h_0|^2$, wherein $x=2(|h_0|^2+|h_2|^2)$; $y=|h_1|^2$; and $h_0$, $h_1$, $h_2$ are complex-valued filter coefficients of the CIR, and
wherein a complex valued channel impulse response is identified as the
minimum phase, when the first inequality, the second inequality and the third inequality are satisfied,
the maximum phase, when the first inequality and the second inequality are satisfied and the third inequality is not satisfied, and
the mixed phase, when at least one of the first inequality and the second inequality is not satisfied.

16. The method of claim 15, wherein all pass prefiltering is performed based on a difference equation with poles inside a unit circle given by:

$$\frac{H_{min}(z)}{H(z)} = \frac{H^*(1/z^*)}{H^*_{min}(1/z^*)},$$

wherein:
- H(z)=z-transform of the CIR;
- Hmin(z)=z-transform of the minimum phase equivalent of the CIR;
- H*(1/z*)=time reversed complex conjugate of H(z); and
- Hmin*(1/z*)=time reversed complex conjugate of Hmin(z), and wherein transformation of the mixed phase CIR is performed using a first order difference equation and transformation of maximum phase CIR is performed using a second order difference equation.

17. A transceiver for processing a signal in a communication system, the transceiver comprising:
- a computation block configured to identify a Channel Impulse Response (CIR) of the signal as a minimum, a maximum or a mixed phase, enable all pass filtering of the signal when the CIR of the signal is identified as the mixed phase, and enable processing of the signal in a time reversed direction when the CIR is identified as the maximum phase;
- an all pass filter configured to transform the signal to a minimum phase equivalent; and
- an equalizer configured to process the signal in the time reversed direction,
- wherein the signal is allowed to pass through without performing prefiltering when the CIR of the signal is identified as the minimum phase.

18. The transceiver of claim 17, wherein the computation block is further configured to perform root identification when the CIR of the signal is identified as the mixed phase.

19. The transceiver of claim 17, wherein the computation block comprises:
- a filter type classifier configured to identify the Channel Impulse Response (CIR) of the signal as one of the minimum phase, the maximum phase, and the mixed phase;
- a minimum phase unit configured to allow the signal to pass through without performing prefiltering when the CIR of the signal is identified as the minimum phase;
- a mixed phase unit configured to enable all pass filtering of the signal when the CIR of the signal is identified as the mixed phase; and
- a maximum phase unit configured to enable processing of the signal in time reversed direction when the CIR is identified as the maximum phase.

20. The transceiver of claim 19, wherein the computation block is further configured to perform root identification when the CIR of the signal is identified as the mixed phase.

* * * * *